Figure 7:
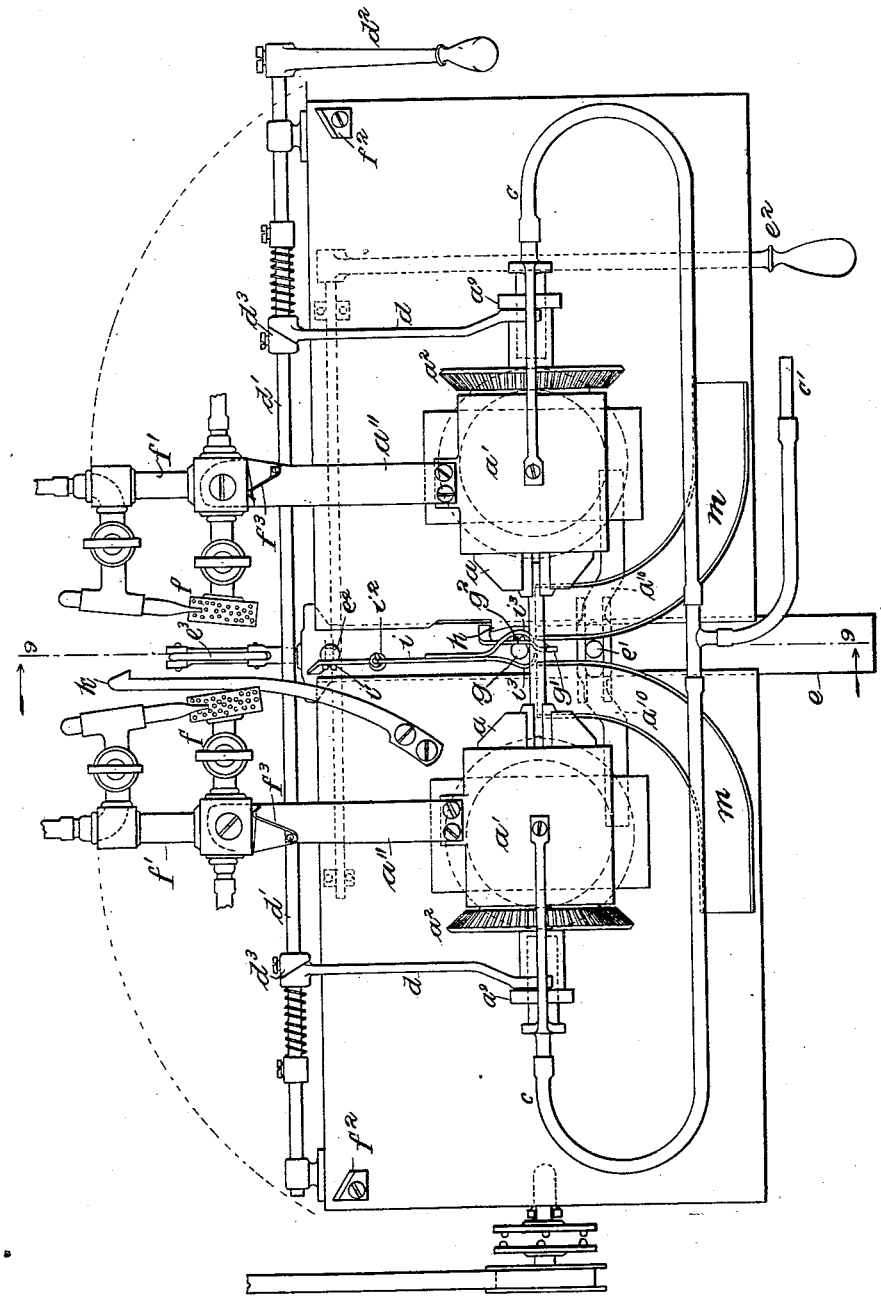

No. 677,548. Patented July 2, 1901.
F. H. LOVERIDGE.
MACHINE FOR MAKING GLASS CAPS.
(Application filed Nov. 23, 1900.)
(No Model.) 4 Sheets—Sheet 1.
Fig. 1.
Fig. 2.
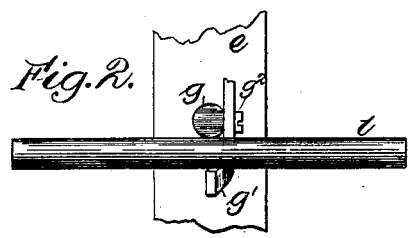
Fig. 3.
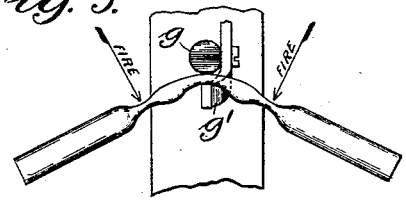
Fig. 4.
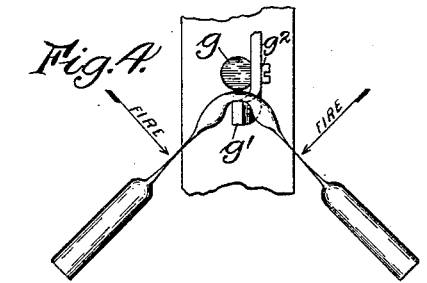
Fig. 6.
Fig. 5.
Witnesses:
J. M. Skinkle.
N. W. Leach
Inventor:
Frederick H. Loveridge,
By George N. Borton,
Attorney.

No. 677,548. Patented July 2, 1901.
F. H. LOVERIDGE.
MACHINE FOR MAKING GLASS CAPS.
(Application filed Nov. 23, 1900.)
(No Model.) 4 Sheets—Sheet 2.

Witnesses:
Inventor:
Frederick H. Loveridge,
By George A. Borton
Attorney.

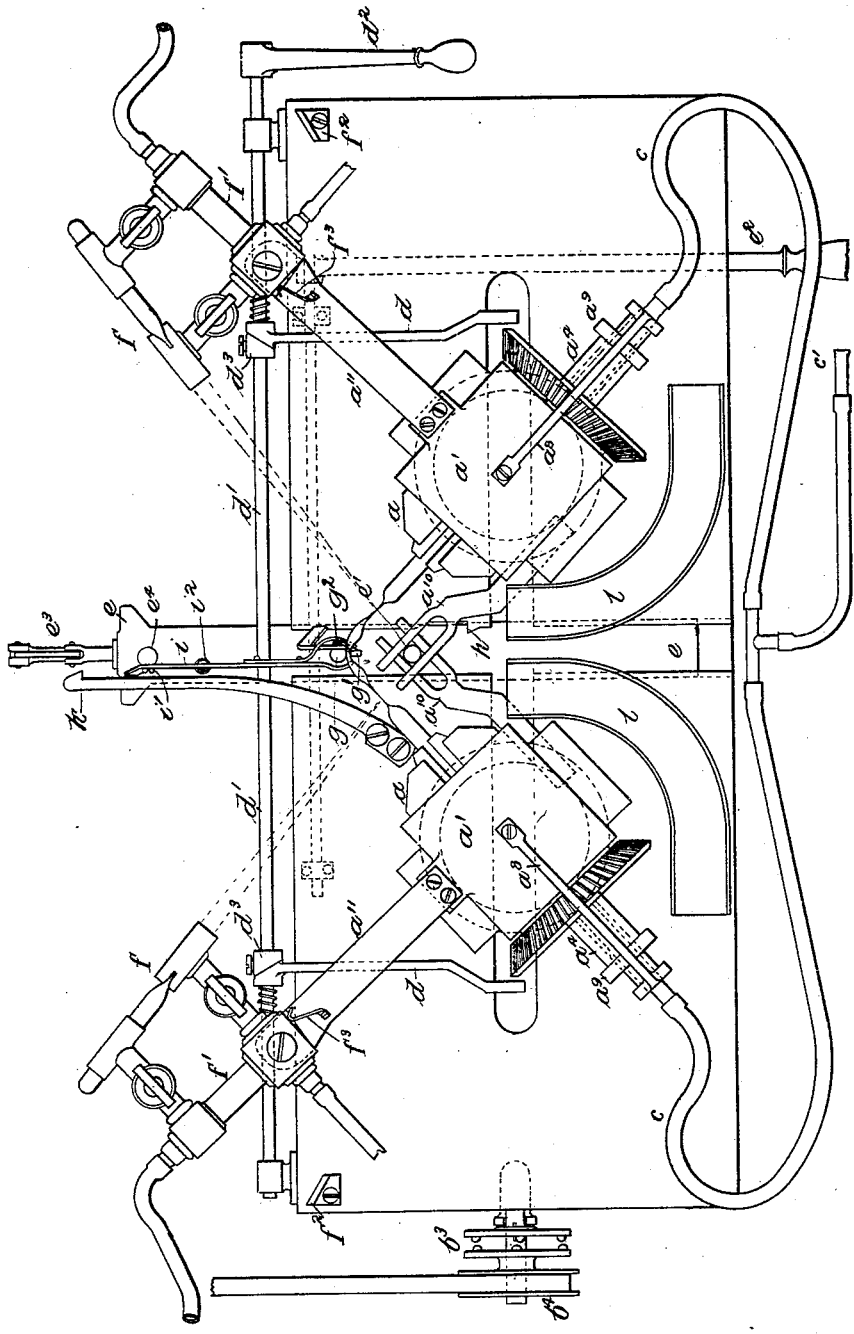

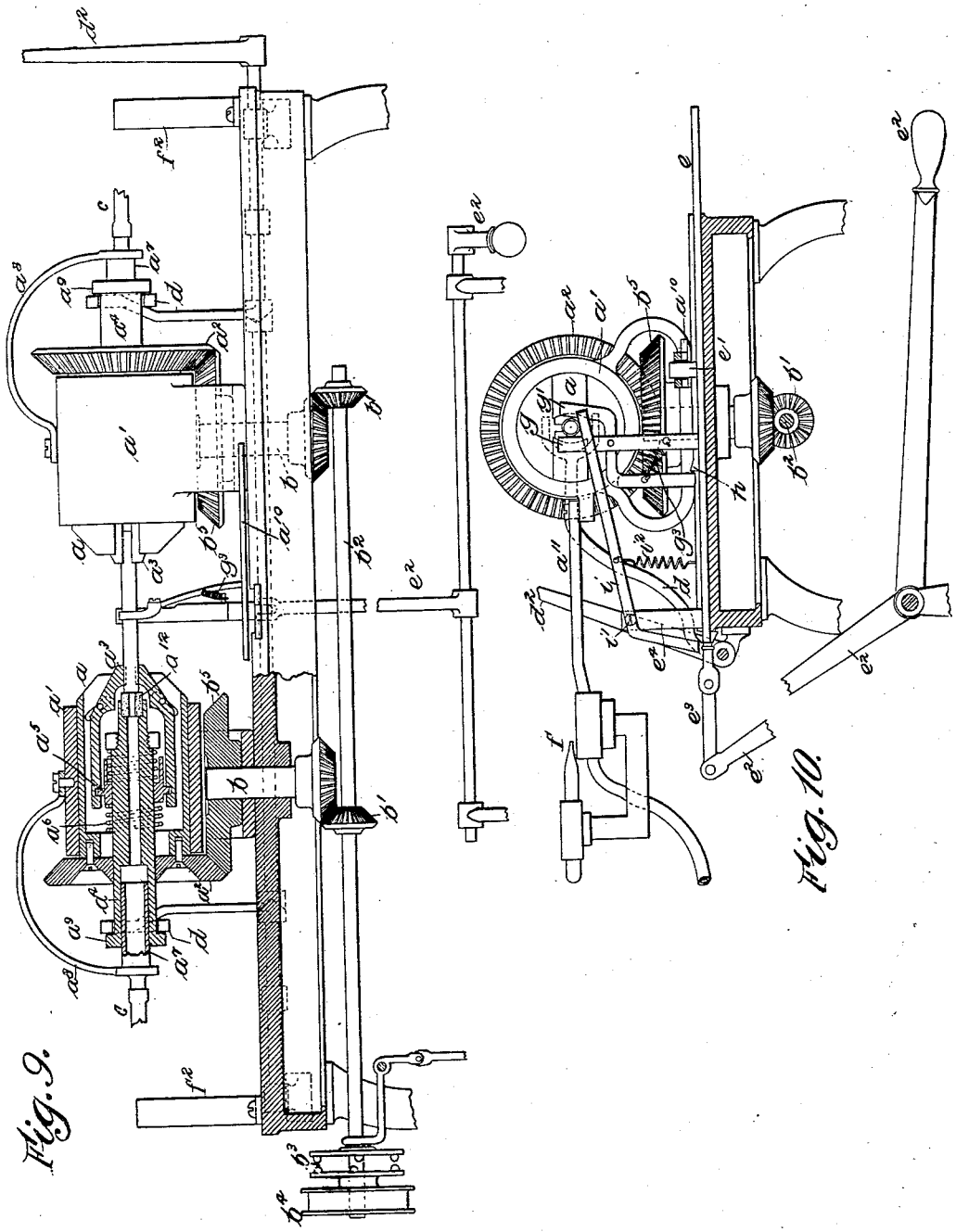

UNITED STATES PATENT OFFICE.

FREDERICK H. LOVERIDGE, OF CHICAGO, ILLINOIS, ASSIGNOR TO THE WESTERN ELECTRIC COMPANY, OF SAME PLACE.

MACHINE FOR MAKING GLASS CAPS.

SPECIFICATION forming part of Letters Patent No. 677,548, dated July 2, 1901.

Application filed November 23, 1900. Serial No. 37,464. (No model.)

*To all whom it may concern:*

Be it known that I, FREDERICK H. LOVERIDGE, a citizen of the United States, residing at Chicago, in the county of Cook and State of Illinois, have invented a certain new and useful Improvement in Machines for Making Glass Caps, (Case No. 21,) of which the following is a full, clear, concise, and exact description.

My invention relates to the manufacture of miniature incandescent lamps such as those used as signals in the central-office switchboards of telephone-exchanges.

In a joint application with Frank R. McBerty, Serial No. 35,540, filed November 5, 1900, I have described a machine for making an incandescent-lamp bulb by fitting a cylindrical glass cap upon a glass stem which supports the filament and leading-in wires and sealing these two parts together by fusion or welding at their ring of contact.

The present invention is concerned with the manufacture of the glass cap which when united with the stem forms the bulb of the incandescent lamp.

This invention consists in certain mechanism and combinations of mechanical parts with heating and blowing devices for manipulating short sections of glass tubing to transform each section or length into two glass caps with rounded ends suitable for use in the making of the bulbs of incandescent lamps, as described, both of such caps being made at the same time in a single operation.

I will describe my invention in detail by referring to the accompanying drawings, which illustrate the preferred embodiment thereof, and that which I regard as new will be set forth in the appended claims.

Figures 1 to 5, inclusive, show the successive steps in the process of making two lamp-caps simultaneously from a single length or section of glass tubing; and Fig. 6 shows how the cap thus formed may be united with a glass stem carrying a filament to form the bulb of an incandescent lamp. Fig. 7 is a plan view of the machine of my invention. Fig. 8 is a similar view showing the parts in an alternative position. Fig. 9 is a front elevation of the machine, partially in section; and Fig. 10 is a vertical sectional view on line 9 9 of Fig. 7.

Similar letters of reference are used to designate the same parts wherever they are shown.

Two horizontal chucks $a$ $a$ are journaled to rotate in bearings $a'$ $a'$, which are pivoted to swing in horizontal planes about vertical shafts $b$ $b$ as axes. The two shafts are journaled in the framework of the machine and are driven through bevel-gears $b'$ $b'$ by a common driving-shaft $b^2$, which in turn is driven through a clutch $b^3$ by a belt-wheel or driving-pulley $b^4$. The chucks $a$ $a$ carry bevel gear-wheels $a^2$ $a^2$, which mesh with bevel-gears $b^5$ $b^5$, mounted upon the upper ends of the short vertical shafts $b$ $b$, whereby both chucks are driven in the same direction at the same speed from the driving-shaft $b^2$. The interior structure of the chucks is shown in section in Fig. 9. Two jaws $a^3$ $a^3$ are mounted to slide toward or away from one another in converging slots within the body of the chuck, and a central tubular core $a^4$, which is adapted to slide longitudinally within the chuck, carries projections $a^5$ $a^5$, which are adapted to engage extensions of said jaws, so that as the core is moved in the jaws are forced together and as the core is moved out the jaws are opened. A helical compression-spring $a^6$ encircles the core and presses against the projections $a^5$, tending to keep the jaws $a^3$ $a^3$ closed. A cylindrical tube or sleeve $a^7$ is stationarily mounted upon a bracket $a^8$, attached to the pivoted framework or bearing $a'$. This tube $a^7$ fits closely in the outer end of the tubular core $a^4$ and is connected by a rubber tube $c$ with a mouthpiece $c'$, so that the attendant by blowing into said mouthpiece may force air through the bore of the tubular core. The whole chuck, including the core $a^4$, rotates when driven by the bevel-gear $b^5$, and, as before mentioned, the core is longitudinally movable within the chuck; but the tube or sleeve fits so closely into the end of the core that a practically air-tight joint is provided. The cores $a^4$ of the chucks are provided with annular enlargements $a^9$ upon their outer ends, and in order to move the cores to open the chucks a pair of arms $d\ d$ are provided, having bifurcated ends which slip over the cores inside of the annular enlargements $a^9$ when the two chucks are in alinement. The arms $d\ d$ are mounted to slide longitudinally upon a rotatable shaft $d'$, which is adapted to be turned by a manual lever $d^2$, mounted thereon at the side of the machine. The shaft $d'$ carries cams $d^3\ d^3$, which are adapted when the shaft is rotated to engage the arms $d\ d$ and slide them along the shaft in opposite directions. When the arms $d\ d$ are thus moved apart, the bifurcated ends thereof engage the annular enlargements $a^9\ a^9$ of the cores, thus pulling the cores out and opening the jaws of the chucks. Besides being capable of rotation the two chucks are pivoted to swing in a horizontal plane about the shafts $b\ b$, and to cause this swinging motion each chuck is provided with a slotted or forked extension $a^{10}$, which extensions are engaged by a pin $e'$, carried upon a sliding cross-bar $e$. As shown most clearly in Figs. 7, 8, and 10, this bar $e$ is mounted to slide across the bed of the machine between the two chucks, and as it moves the pin $e'$ engages the slotted extensions or levers $a^{10}\ a^{10}$ of the two chucks and moves them, thus swinging the chucks about their vertical axes.

A manual lever $e^2$ is provided for reciprocating the cross-bar $e$, said lever being connected with the cross-bar by a link $e^3$, as shown most clearly in Fig. 10.

A pair of glassblower's fires $f f$ is provided in connection with the pair of chucks, the swinging framework $a'$ of each chuck carrying an extension $a^{11}$, upon which the standards $f'\ f'$ of the gas and air jets are pivoted. Springs $f^3\ f^3$ are provided upon the extensions $a^{11}$, which springs bear against the pivoted standards $f'\ f'$ of the fires and maintain the parts normally in a position such that the flame of each fire will be directed nearly at the central point between the two chucks. When, however, the chucks are swung around by the lever $e^2$ to their extreme positions, the standards $f'\ f'$ strike against projections or lugs $f^2\ f^2$, mounted upon the framework of the machine, and the standards $f'$ are thereby slightly rotated relatively to the extensions $a^{11}$, the effect being to direct the flame to a point a little nearer the end of the chuck. This feature will be understood by a reference to Fig. 8.

The cross-bar $e$ carries an upright post $g$, which when the chucks are in alinement occupies a position a little to one side of the axial line of the chucks, and this post carries a gripping lever or nipper $g'$, which is pivoted at $g^2$ upon the post. A spring $g^3$ connects the gripper with the post and tends to force these two parts together. When the chucks are in alinement, however, the lower end of the gripper is engaged by an abutment or lug $h$, formed upon the framework or bed of the machine. In other words, the post and the gripper form a pair of spring-actuated jaws or nippers which are open upon either side of the axial line between the chucks when said chucks are in alinement, but which are closed together by the spring when the bar $e$ slides across the bed to swing the chucks about their vertical axes.

A bell-crank kicking-arm $i$ is pivoted at $i'$ to a post $e^4$, carried by the sliding cross-bar $e$. Said kicking-arm has two fingers at its end, which encircle the jaws $g\ g'$. A spring $i^2$ holds the kicking-arm normally in a position so that the fingers $i^3$ upon the end thereof will lie a little below the axial line between the chucks; but when the bar is moved out to swing the chucks about their vertical axes and before the cross-bar reaches the outward end of its journey the foot of the kicking-arm $i$ is engaged by a catch $k$, mounted upon the framework of the machine, and as the bar continues its travel outward the kicking-arm is rocked upon its pivot, so that the fingers $i^3\ i^3$ at the ends thereof move upward about the jaws $g\ g'$, tending to throw out of said jaws anything that may be held therein.

Having now described the construction of the machine in detail, I will proceed to explain its operation in the process of making lamp-caps. For this purpose it will be well to refer first to Figs. 1 to 6, inclusive, which illustrate the successive steps in the manipulation of a section of glass tubing by which it is transformed into two lamp-caps. A section of tubing $l$ of the proper length is shown in Fig. 1. The attendant who operates the machine is supplied with a number of these short sections of glass tubing of the same length, and having selected one of them she draws down the lever $d^2$ of the machine, thus opening the two chucks (which are, of course, at this time in alinement) and inserts the tubing into the chucks from above. Then she releases the lever $d^2$, whereby the spring-impelled arms $d\ d$ move toward one another, thus permitting the tubular cores to be forced inward by the helical springs $a^6\ a^6$ in the interior of the chucks, whereby the jaws $a^3\ a^3$ of each chuck are closed upon the end of the glass tube. The inner ends of the tubular cores $a^4\ a^4$ are provided with tubular rubber tips $a^{12}\ a^{12}$, which when the jaws of the chuck close upon the side of the glass tube are adapted to abut against the end of the tube and make an air-tight connection between the glass tube and the tubular core, to which air is supplied from the rubber tube $c\ c$. Having fastened the glass tube in position in the chucks, the attendant starts the rotation of the chucks and at the same time turns on the glass-blower's fires $f f$, the points of the flames being directed upon the central portion of the tubing between the chucks upon either side of the jaws $g\ g'$, as shown by the arrows in Fig. 3. After the central portion of the glass tube has been softened sufficiently by the heat the attendant gradually raises the operating-lever $e^2$, whereby the bar $e$ is caused to slide across the bed of the machine. As it begins to move the spring-actuated nipper $g'$ closes upon the central portion of the glass, as shown in Fig. 3, and begins to draw out the heated portion of the glass, while at the same time the chucks $a\ a$ swing about their vertical axes $b\ b$ to follow the movement of the nippers. The flames from the gas-blower's fires $f\!f$ being caused to swing with the chucks continue to play upon the glass as it is being drawn out, and as the cross-bar continues its journey the glass is drawn out so thin that under the influence of the flames the central portion held by the nippers is completely separated from the end pieces held by the chucks, the thin piece of glass between the nippers and the ends being melted down by the flames. Fig. 4 shows how the central portion of the glass is drawn away from the end pieces in this manner, and Fig. 8 shows the several parts of the machine in the positions which they occupy at this stage of operation. As the cross-bar $e$ reaches the end of its journey the foot of the kicking-arm $i$ is caught by the catch $k$, and the fingers $i^3$ upon the end of said kicking-arm are moved up about the nippers $g\ g'$, knocking out the small piece of glass which has been drawn out from the central portion of the glass tubing. When the chucks swing far enough so that the mountings $f'\ f'$ of the fires strike the abutments $f^2\ f^2$, the mountings are swung in against the tension of the spring $f^3\ f^3$ to change the direction of the flames, so that they will play a little nearer the chucks, to bring the points of the flames upon the ends of the glass pieces held by the chucks. The operator now blows into the mouthpiece $c'$, and the air is communicated through the interior of the chucks with the glass pieces held therein, so that the ends are rounded out, as shown in Fig. 5. The caps now being completely formed, the lever $e^2$ is lowered until the chucks are swung around into alinement, whereupon the lever $d^3$ is operated to open the chucks. The glass caps being released fall out of the chucks into guideways $m\ m$ and are carried off into boxes waiting to receive them. As the cross-bar returns to its initial position the foot of the nipper $g'$ strikes the lug or abutment $h$, so that the jaws of the nippers are opened sufficiently to allow another section of glass tubing to be placed in the chucks. A complete cycle in the operation of the machine has now been traced.

Having thus described my invention, I claim as new, and desire to secure by Letters Patent, the following:

1. The combination with a pair of chucks adapted to hold a length of glass tubing, of means for rotating the chucks together in the same direction at the same speed, means for heating the glass tubing at a point between the chucks, a pair of nippers adapted to grasp the glass tubing where heated, means for retracting the nippers and simultaneously swinging each of the chucks about an axis at an angle with its axis of rotation, whereby the central heated portion of the glass tubing is drawn out and severed from the two ends, and means for blowing air into the two ends within the chucks to round out the heated tips, as set forth.

2. The combination with a pair of chucks adapted to hold a length of glass tubing, of means for rotating the chucks together in the same direction at the same speed, a mounting for each chuck permitting it to be swung, while rotating, about an axis at an angle with its axis of rotation, a gas-jet or fire carried by the mounting of each chuck, to swing therewith, said fires being adapted to heat the glass tubing intermediate of the chucks, a pair of nippers adapted to grasp the heated portion of the tubing, and means for swinging the chucks and for simultaneously retracting the nippers, whereby the heated portion of the tubing is drawn out and severed from the ends held by the chucks, as set forth.

3. The combination with a pair of chucks adapted to hold a length of glass tubing, of means for heating the glass tubing between the two chucks, a pair of nippers adapted to grasp the heated portion, means for swinging each chuck about an axis at an angle with its axis of rotation, means for simultaneously retracting the nippers, whereby the central heated portion is drawn out and finally severed from the ends held by the chucks, and a kicking-lever automatically actuated in retracting the nippers, for disengaging the withdrawn portion of glass from the nippers, as set forth.

4. The combination with a pair of chucks, each having jaws adapted to grasp the end of a length of glass tubing which may be placed in the chucks, of a longitudinally-movable core for each chuck, a soft-rubber tip for each of said tubular cores adapted to form an airtight cushion between the tubular core and the glass tubing, and means for blowing air through said tubular cores, substantially as described.

5. The combination with a pair of chucks, each having jaws adapted to grasp the end of a length of glass tubing which may be placed in the chucks, of a longitudinally-movable tubular core for each chuck, a soft-rubber tip for each of said tubular cores, adapted to form an air-tight cushion against the end of the glass tubing held in the chuck, a connection between each movable tubular core and the jaws of its chuck, whereby said jaws are operated in the movement of the core, a spring for each chuck tending to keep the core normally pressed forward and the jaws tightened, and means for simultaneously retracting the cores of both chucks and opening the jaws thereof, as set forth.

6. The combination with a pair of rotatable chucks, of a mounting for each chuck adapted to swing about an axis at right angles with the axis of rotation of the chucks, means for rotating the chucks, a sliding cross-bar and means for reciprocating the same, a pin $e'$ carried by the cross-bar, and extensions for the swinging mountings of said chucks, said extensions having slots engaged by said pin, whereby the chucks are swung around together by the reciprocation of the cross-bar, as set forth.

7. The combination with a pair of rotatable chucks, of a mounting for each chuck adapted to swing about an axis at right angles with the axis of rotation of the chucks, a sliding cross-bar and means for reciprocating the same, a pin $e'$ carried by the cross-bar, extensions for the swinging mountings of said chucks, said extensions having slots engaged by said pin, whereby the chucks are swung around together by the reciprocation of the cross-bar, and a pair of nippers carried by the cross-bar, for grasping the central portion of a section of heated glass tubing held by said chucks and drawing it out, as set forth.

8. The combination with a pair of chucks adapted to hold a length of glass tubing, of means for rotating the chucks together in the same direction at the same speed, a mounting for each chuck permitting it to be swung while rotating about an axis at an angle with its axis of rotation, a gas-jet or fire carried by the mounting of each chuck to swing therewith, said fires being adapted to heat the glass tubing between the chucks, a pair of nippers adapted to grasp the heated portion of the tube, means for swinging the chucks and for simultaneously retracting the nippers, whereby the heated portion of the tubing is drawn out and severed from the ends held by the chucks, and means for swinging the gas-jets relatively to the chucks, to bring the points of the flames to play upon the ends of the glass pieces held by said chucks, as set forth.

9. The combination with a pair of rotatable chucks adapted to hold a length of glass tubing, each of said chucks having a mounting permitting the same to swing, while rotating, about an axis at an angle with its axis of rotation, a fire for heating the glass tubing at a point between the two chucks, a pair of nippers adapted to grasp the glass tubing where heated, and means for swinging the chucks and for simultaneously retracting the nippers, whereby the heated portion of the tubing is drawn out, as set forth.

10. The combination with a pair of rotatable chucks adapted to hold a length of glass tubing, of means for heating the tubing at a point between the chucks, a pair of nippers adapted to grasp the heated portion of the tubing, and means for retracting said nippers, whereby the central portion of the glass tubing is drawn out and severed from the ends held by the chucks, as set forth.

In witness whereof I hereunto subscribe my name this 20th day of October, A. D. 1900.

FREDERICK H. LOVERIDGE.

Witnesses:
ELLA EDLER,
THOMAS A. PITHER.